(12) United States Patent
Piskorz et al.

(10) Patent No.: US 9,458,832 B2
(45) Date of Patent: Oct. 4, 2016

(54) ASSEMBLY OF AIR AND PNEUMATIC DEVICES

(76) Inventors: Waldemar Piskorz, Kodeń (PL); Tomasz Tadeusz Piskorz, Kodeń (PL)

( * ) Notice: Subject to any disclaimer, the term of this patent is extended or adjusted under 35 U.S.C. 154(b) by 539 days.

(21) Appl. No.: 14/111,722

(22) PCT Filed: Mar. 28, 2012

(86) PCT No.: PCT/PL2012/000018
§ 371 (c)(1),
(2), (4) Date: Dec. 10, 2013

(87) PCT Pub. No.: WO2012/141603
PCT Pub. Date: Oct. 18, 2012

(65) Prior Publication Data
US 2014/0083091 A1    Mar. 27, 2014

(30) Foreign Application Priority Data

Apr. 14, 2011  (PL) ...................... P-394367

(51) Int. Cl.
| | | |
|---|---|---|
| *F03D 3/04* | (2006.01) | |
| *F03D 9/02* | (2006.01) | |
| *F03D 3/02* | (2006.01) | |
| *F03D 3/06* | (2006.01) | |

(52) U.S. Cl.
CPC .................. *F03D 9/028* (2013.01); *F03D 3/02* (2013.01); *F03D 3/065* (2013.01); *F03D 9/17* (2016.05); *F03D 15/00* (2016.05); *F05B 2240/40* (2013.01); *F05B 2260/40* (2013.01); *Y02E 10/74* (2013.01)

(58) Field of Classification Search
CPC ............ F03D 3/00; F03D 3/005; F03D 3/02; F03D 3/04; F03D 3/0409; F03D 7/06; F03D 9/02; F03D 9/028; F03D 9/10; F03D 9/17

USPC ........................ 415/80, 81, 82, 4.2, 4.4, 907
See application file for complete search history.

(56) References Cited

U.S. PATENT DOCUMENTS

2003/0209911 A1* 11/2003 Pechler ................. F03D 3/0427
290/55

FOREIGN PATENT DOCUMENTS

| JP | 2002130110 A | 5/2002 |
|---|---|---|
| WO | 2009114920 A1 | 9/2009 |

OTHER PUBLICATIONS

International Search Report; PCT/PL2012/000018; Aug. 21, 2012.

* cited by examiner

*Primary Examiner* — Richard Edgar
(74) *Attorney, Agent, or Firm* — Westman, Champlin & Koehler, P.A.; Z. Peter Sawicki

(57) ABSTRACT

An assembly of air and pneumatic devices, especially a high power unit, intended for power generation. The invention consists in that the assembly is preferably made up of three columns consisting of segments arranged coaxially, connected with rigid connecting bars. The stators of the segments have four struts connected to plates, with at least one strut having attached to it a conduit for feeding compressed air, said conduit being equipped with nozzles. Shafts of rotors of one column are coupled with a compressor unit which is connected to a compressed air tank. The compressed air tank is connected via a solenoid valve, a compressed air unit and its branchings to conduits of the stators of the other columns. The solenoid valve is connected via a control system to a speed meter of the rotor.

11 Claims, 7 Drawing Sheets

ASSEMBLY OF AIR AND PNEUMATIC DEVICES

CROSS REFERENCE TO RELATED APPLICATIONS

Figure 1:
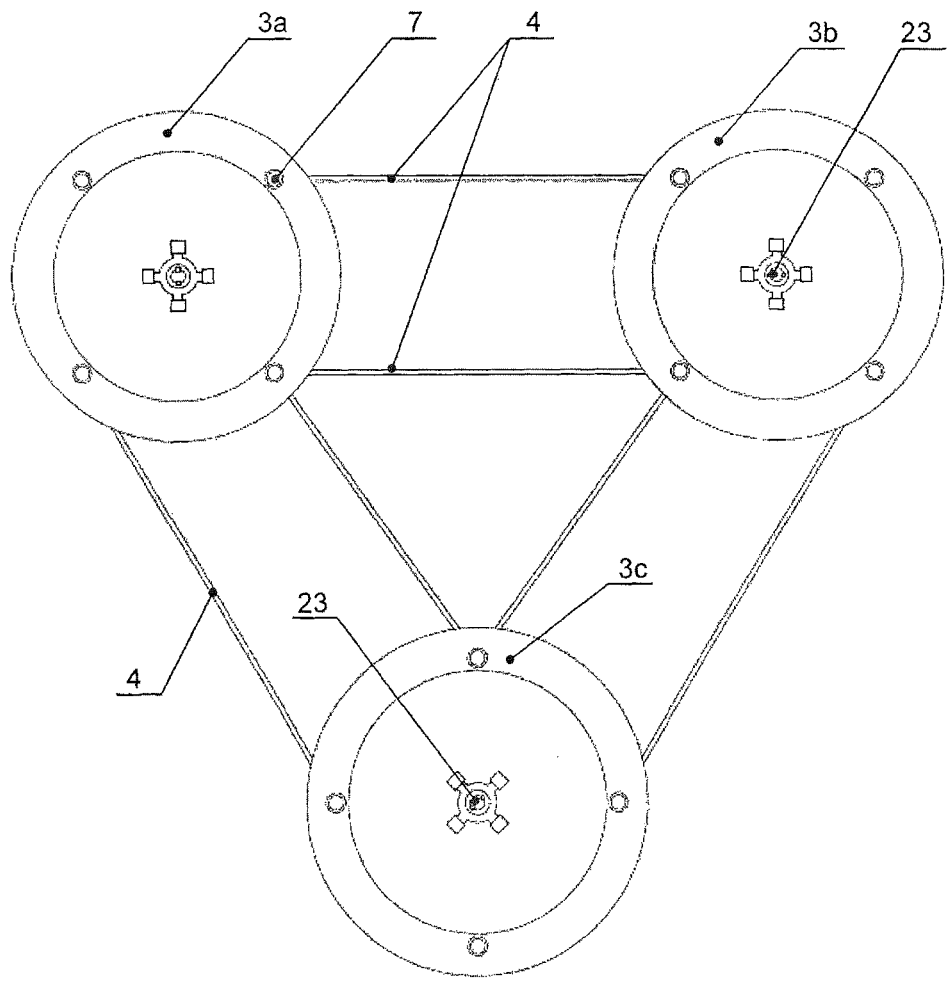

This application is a Section 371 National Stage Application of International Application No. PCT/PL2012/000018, filed Mar. 28, 2012, and published as WO 2012/141603, on Oct. 18, 2012, in English, which claims priority to and benefits of Polish Application No. P-394367, filed Apr. 14, 2011, the contents of which are hereby incorporated by reference in their entirety.

The subject of the present invention is an assembly of air and pneumatic devices, especially of high power devices, intended for power generation.

Known from the Japanese Application JP2002130110 is a wind power plant of any height, consisting of multiple engine units with guiding vanes and auxiliary guiding vanes arranged coaxially. The rotors of individual units are connected through ratchet wheels in conjunction with ratchets in order to transfer torque to power receptors.

According to the present invention, an assembly of devices is created from at least two, preferably three, columns interconnected with rigid connecting bars forming a truss construction. Each column is compiled from at least three vertical segments coaxially stacked one on top of another, the first one from the ground being fixed to a base. Connecting bars are preferably installed between every other segment.

A segment consists of a stator and a rotor. The stator of a segment is formed by four tubular struts connected at each end via round plates, a lower and an upper one, mutually parallel, with the tips of the struts extending beyond the plates. The upper plate consists of a ring and a bearing plate, which are connected detachably using bolts. The struts are spaced symmetrically around a circle with a diameter of less than the distance between the plates. Clamping rings are put onto the tips extending beyond the lower plate and are fixed to the plate. The clamping rings are equipped with lugs for fixing the connecting bars that connect the columns. The tips and the clamping rings comprise openings arranged in one direction and equally distant from the outer edges of the struts or clamping rings, intended for linchpins which link individual segments. In the axis of symmetry of the lower and the upper plates there are brackets for installing bearings. Fixed to the struts and the plates are two vertical panels arranged within one plane passing through strut axis, said panels being inclined at an acute angle with respect to a radius running from the axis of the plate to the axis of the strut. Between the panels there are embedded guide vanes in the form of rectangular walls, evenly spaced apart around a circle and inclined at an acute angle with respect to the radius passing through their centers.

At least one strut of each stator has a compressed air conduit connected to it at the point of its connection to the internally located panel. Each compressed air conduit in the stator is equipped with nozzles which are directed in a similar way as the panels.

The stator houses a rotor whose shaft is supported on bearings. The shaft has two discs attached to it, between which discs there are vertical rotor blades arranged around the periphery, preferably in a quantity greater than eight, said blades having a semi-cylindrical shape. The stator guide vanes are so arranged with respect to the rotor blades that planes passing through the guide vanes are tangent to a circle on which there are axes of the semi-cylindrical rotor blades.

Coupling disks are installed onto the rotor shaft tips projecting beyond bearing brackets, said disks being provided with strips which have fenders located on the outer side. The sides of the fenders are lined with flexible overlays.

Rotor shafts of one column are coupled with a compressor connected to a compressed air tank. Going out from the tank are compressed air conduits which are connected to the compressed air conduits in the stators, located in the other columns. The compressed air conduits of stators arranged into a column are connected leak-tight. Between the compressed air tank and the conduits in the stators there is installed a solenoid valve connected through a control system to a rotor speed meter.

The solution according to the present invention enables uninterrupted reception of power from those wind engine segments which are coupled with the devices being driven. During no wind periods the rotors of those segments are driven by the compressed air accumulated in the tank. Preferably, every third column of the air and pneumatic devices assembly is intended for the compression of air. The design of the segments ensures quick assembly and stability of the column unit, especially in a layout where the columns are arranged in an equilateral triangle layout. Besides that, the design of the segment is characterized by a highly efficient utilization of wind force.

Figure 2:
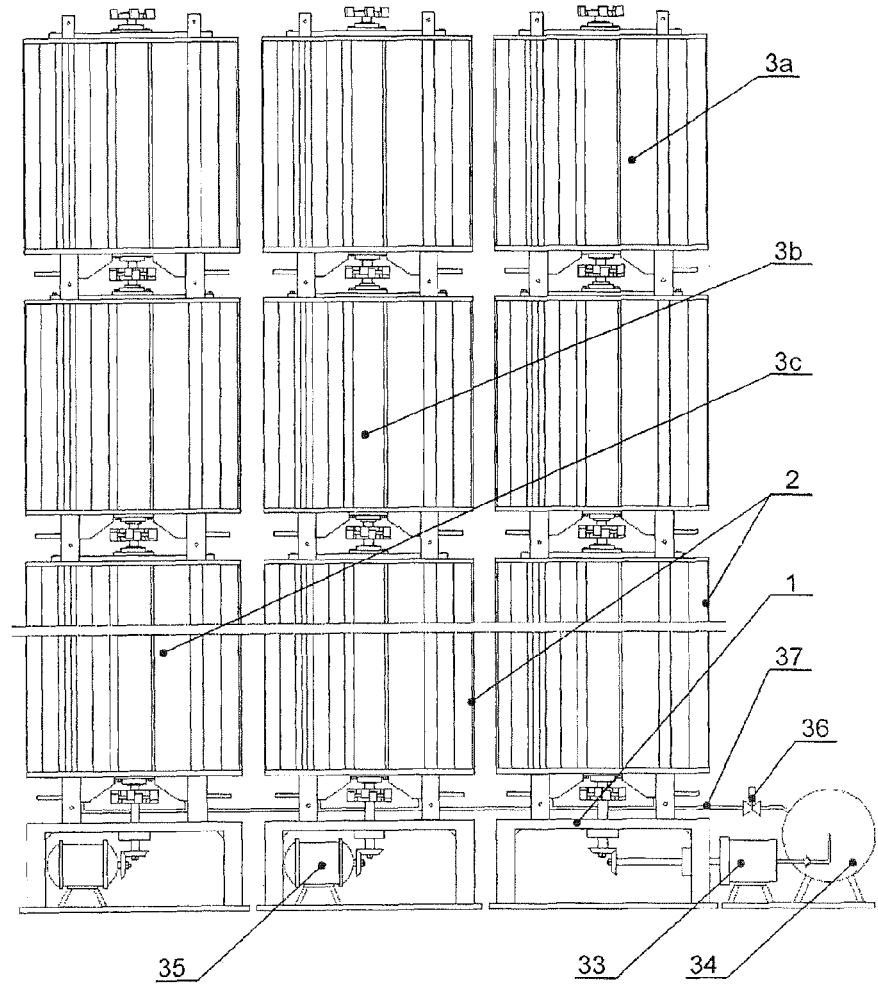
Figure 3:
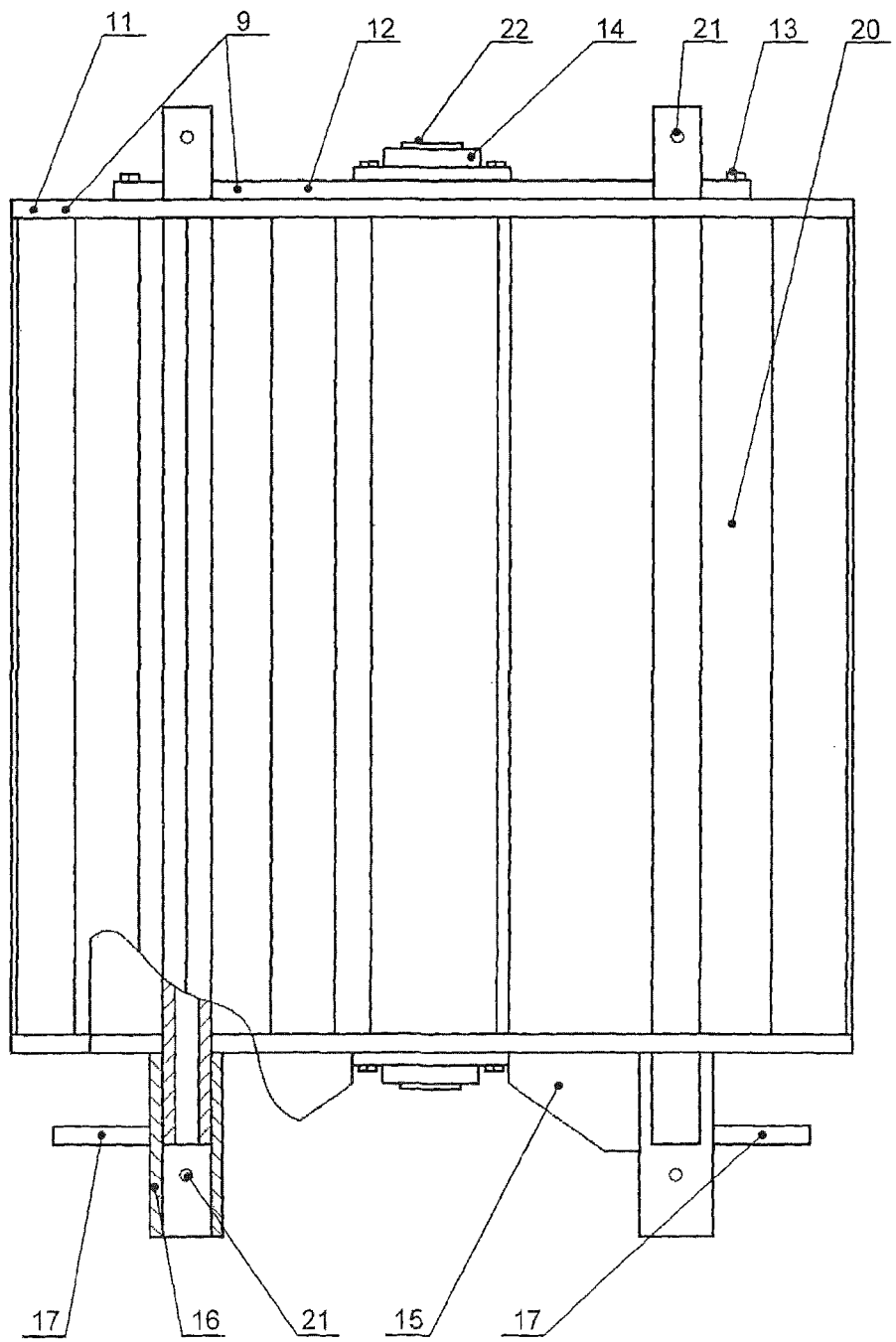
Figure 4:
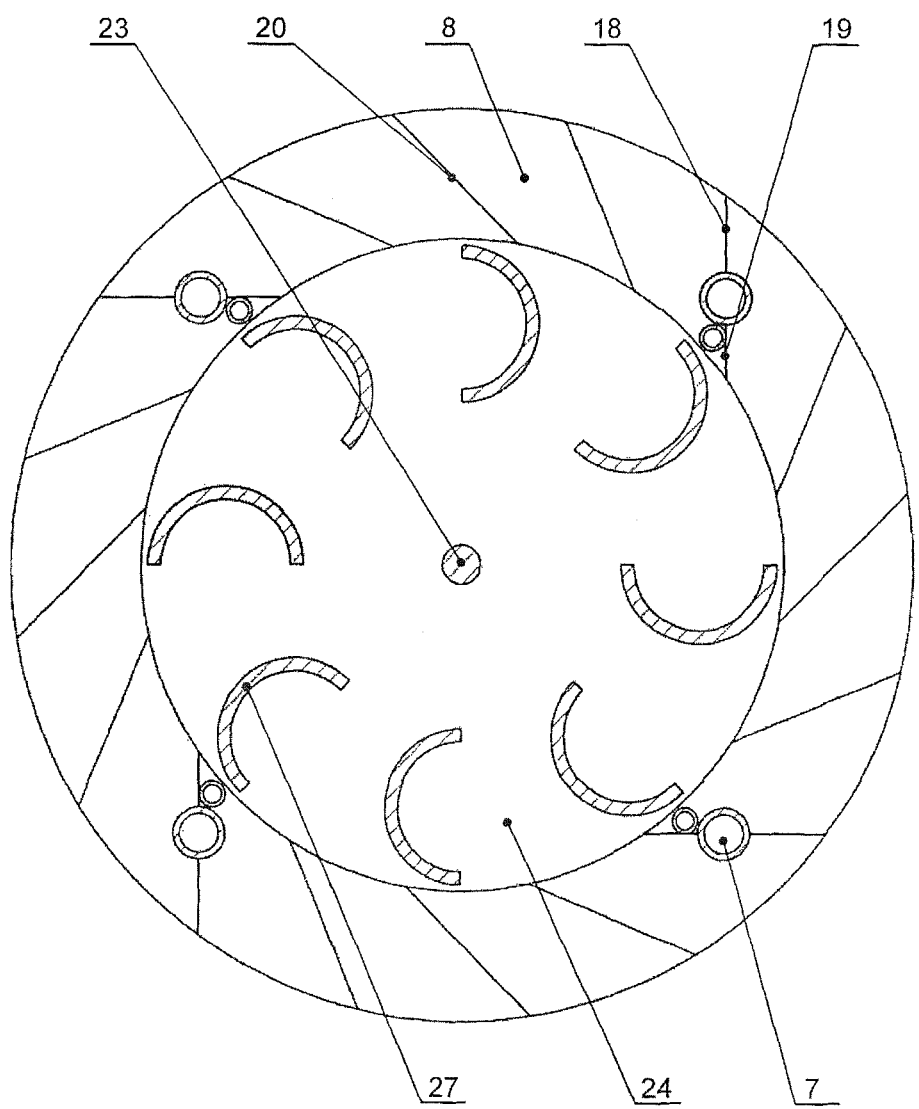
Figure 5:
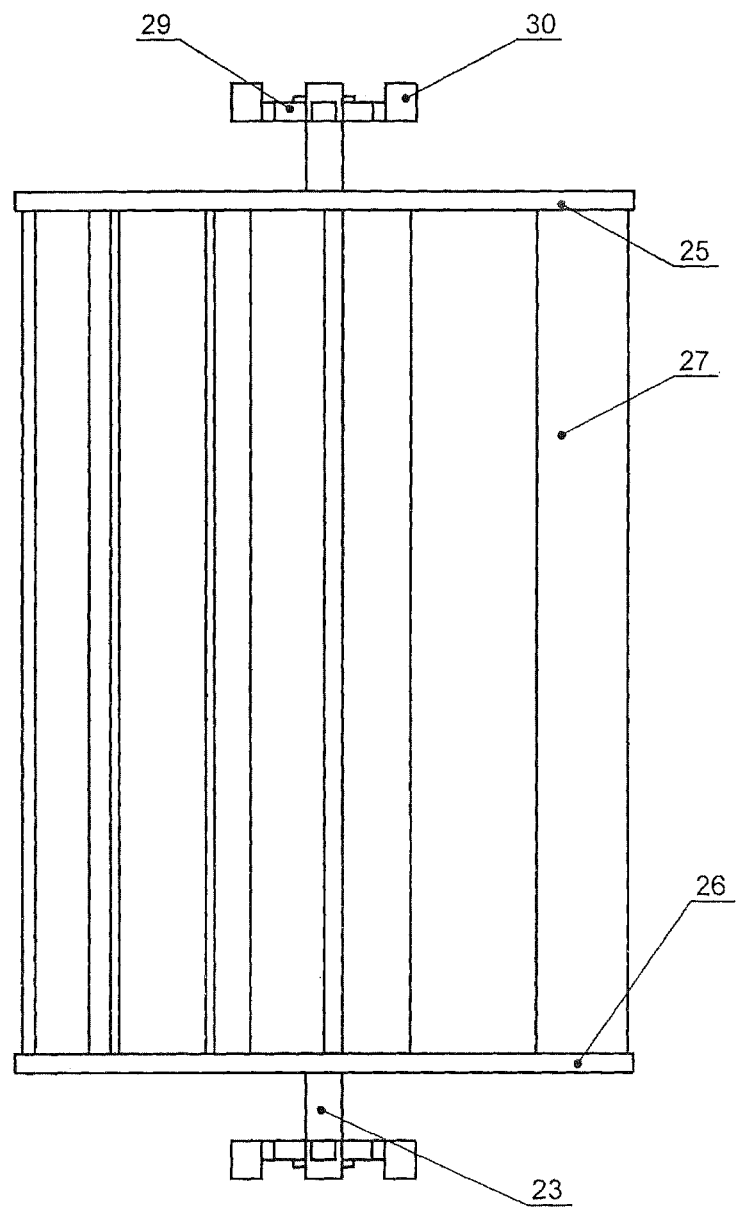
Figure 6:
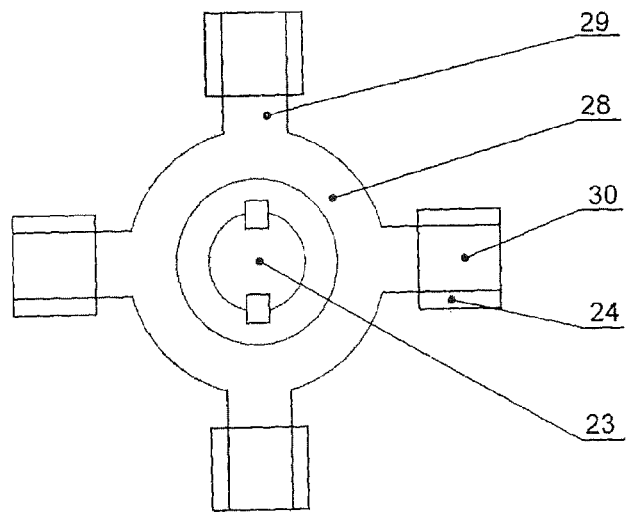
Figure 7:
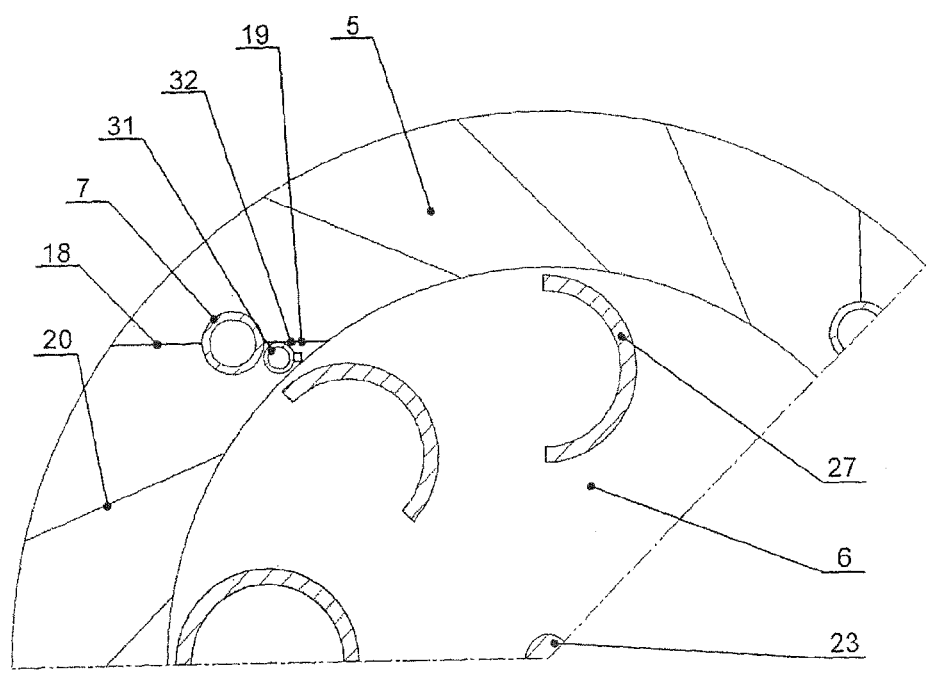
Figure 8:
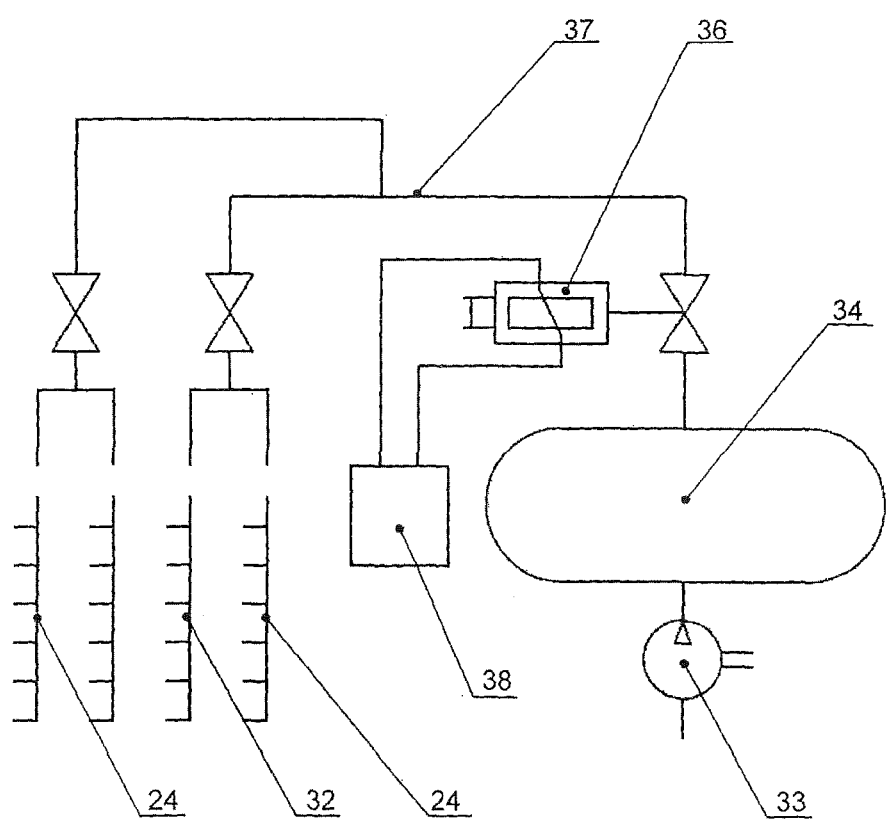

The subject of the present invention is illustrated in an exemplary solution, in which FIG. 1 shows a schematic top view of a three column unit, FIG. 2 is a simplified view of the columns including a compressed air unit, FIG. 3 shows a segment stator in an axial view, enlarged scale, FIG. 4 shows a segment in cross-section, FIG. 5 is a general view of a rotor, FIG. 6 is an enlarged view from the face of the coupling disc, FIG. 7 is a detailed view of a connection between an air conduit and a strut in cross-section, and FIG. 8 is a schematic view of the compressed air unit.

According to the drawing, three base plates 1 anchored in the ground, arranged in an equilateral triangle layout, support each eight wind engine segments 2 in the form of three columns, 3a, 3b and 3c interconnected with rigid connecting bars 4 forming a truss construction. A wind engine segment 2 consists of a stator 5 and a rotor 6. The stator 5 is composed of four tubular struts 7 connected at their ends to a lower plate 8 and an upper plate 9, said plates being parallel with respect to each other, with tips 10 of the struts 7 protruding beyond the plates 8 and 9. The upper plate 9 consists of a ring 11 and a bearing plate 12 attached to the ring 11 with bolts 13. Bearing brackets 14 are bolted to the lower plate 8 and the upper plate 12. The struts 7 are symmetrically spaced on a circle with a diameter of less than the distance between the plates 8 and 9. Four ribs 15 are welded to the bottom plate 8, the shorter side of a rib being connected to clamping rings 16 put onto the tips 10 of the struts 7. The clamping rings 16 are provided with lugs 17 for fixing the connecting bars 4. The struts 7 have welded to them, between the ring 11 and the lower plate 8, panels 18 and 19 situated in a plane passing through the strut axis, said panels 18 and 19 being inclined at an acute angle with respect to the radius running from the axis of the stator 5 to the axis of the strut 7. Between the struts 7 there are sixteen guiding vanes 20 in form of rectangular walls attached to the ring 11 and the lower plate 8. The guiding vanes 20 are evenly spaced around a circle. The tips 10 and clamping rings 16 comprise holes 21 for linchpins connecting individual segments 2, said holes 21 being arranged radially and an equal distance from the edges of the tips 10 or the edges of the clamping rings 16.

Supported in bearings 22 of brackets 14 of stator 5 is a shaft 23 of the rotor 6, whose ends protrude above the brackets 14. The shaft 23 has welded to it two discs 25 and 26 with a diameter slightly smaller than the internal diameter of the ring 11. Between the discs 25 and 26, around their periphery, there are evenly spaced eight rotor blades 27 each having a semi-cylindrical shape, which are inserted in the holes in disks 25 and 26 and permanently connected to them. The ratio of the diameter of a semi-cylindrical rotor blade 27 to the diameter of the disks 25 and 26 is 1:4, The blades 27 are so situated that a straight line passing through the axis of the shaft 23 of the rotor 6 is tangent to both their edges. With respect to the rotor blades 27, the guiding vanes 20 are arranged, similarly to the panels 18 and 19, in planes tangent to a circle around which there are spaced the axes of the semi-cylindrical blades 27. Onto the protruding tips of the shaft 23 of the rotor 6 disks 28 are mounted, said disks having each four strips 29 ending with fenders 30 pointing outwards, said disks 28 being shifted with respect to each other by the width of a fender 30. The sides of the fenders 30 are lined with rubber overlays 24. When two segments 2 are connected, the fenders 30 of the coupling disks 28 will be on the same level.

The struts 7 have attached to them conduits 31 of a compressed air unit, said conduits provided with nozzles 32 whose outlets are directed toward the center of the inner surface of the blades 27. The conduits 31 are provided with leak-tight connectors, enabling the supply of compressed air to the top segment 2. The conduits 31 of the top segment 2 are plugged. A compressor unit 33 is coupled with the shaft of the lower rotor 6 of column 3a and connected to a high pressure air tank 34. The shafts 23 of the rotors 6 of the other two columns 3b and 3c are coupled with electricity generators 35. The compressed air tank 34 is connected through a solenoid valve 36 and a compressed air system 37 and its branchings to the conduits 31 of stators 5 of columns 3b and 3c. The solenoid valve 36 is coupled via a control system 38 to a speed meter of the rotors 6.

The invention claimed is:

1. An assembly of air and pneumatic devices comprising segments which consist of a stator having stationary air guiding vanes and a rotor with vertical rotation axis, said segments stacked into vertical columns supported on base plates, whereas wind engines' shafts connected to each other in the columns are coupled with power receivers, characterized in that the assembly of air and pneumatic devices is composed of at least two columns, connected to each other with rigid connecting bars fixed to stators, whereas each stator is formed by four tubular struts evenly spaced around a circle and connected to a round lower plate and a round upper plate, whereas the struts have two panels fixed to them, said panels located in a plane set at an acute angle with respect to a radius running through the axis of the strut, and additionally at least one strut has a compressed air conduit fixed to it, said conduit equipped with nozzles directed parallel to the panels, whereas in the symmetry axis of the lower plate and the upper plate there are brackets of bearings in which a shaft of the rotor with blades is supported, and the shafts of the rotors of one column are coupled with a compressor unit connected to a compressed air tank which is connected to a compressed air system connected to the conduits of the stators of the other columns.

2. The assembly of air and pneumatic devices according to claim 1, characterized in that the blades of the rotor have a semi-cylindrical shape.

3. The assembly of air and pneumatic devices according to claim 2, characterized in that the guide vanes between the lower plate, and the upper plate in form of rectangular walls are placed in planes which are tangent to a circle on which there are the axes of the semi-cylindrical blades.

4. The assembly of air and pneumatic devices according to claim 3, characterized in that the upper plate consists of a ring to which detachably connected is a bearing plate.

5. The assembly of air and pneumatic devices according to claim 1, characterized in that tips of the struts protrude beyond the lower plate and the ring, said tips having clamping rings mounted on the side of the lower plate or on the ring side.

6. The assembly of air and pneumatic devices according to claim 5, characterized in that the tips and the clamping rings comprise through-holes arranged in one direction and at equal distances from the external edges of the struts or clamping rings.

7. The assembly of air and pneumatic devices according to claim 5, characterized in that the clamping rings are provided with lugs for connecting the connecting bars.

8. The assembly of air and pneumatic devices according to claim 1, characterized in that the connecting bars are attached between every other segment of the at least two columns.

9. The assembly of air and pneumatic devices according to claim 1, characterized in that on the rotor shaft ends protruding beyond the brackets of the bearings there are coupling disks with strips having at their tops fenders placed on the outer side, the sides of the fenders being lined with flexible overlays.

10. The assembly of air and pneumatic devices according to claim 1, characterized in that between the compressed air tank and the conduits in the stators there is installed a solenoid valve connected through a control system with a rotor speed meter.

11. The assembly of air and pneumatic devices according to claim 1, characterized in that the assembly of air and pneumatic devices is composed of three columns.

* * * * *